June 10, 1958  R. W. STINEMAN  2,838,685
CONTROL APPARATUS FOR SYNCHRONIZING
SOURCES OF ALTERNATING CURRENT
Filed Aug. 19, 1957  3 Sheets-Sheet 1

INVENTOR.
RUSSELL W. STINEMAN
BY
K. H. Thomas
ATTORNEY

INVENTOR.
RUSSELL W. STINEMAN
BY
ATTORNEY

INVENTOR.
RUSSELL W. STINEMAN

BY

ATTORNEY

United States Patent Office 2,838,685
Patented June 10, 1958

2,838,685

CONTROL APPARATUS FOR SYNCHRONIZING SOURCES OF ALTERNATING CURRENT

Russell W. Stineman, Seattle, Wash., assignor to Boeing Airplane Company, Seattle, Wash., a corporation of Delaware Application August 19, 1957, Serial No. 678,810

9 Claims. (Cl. 307—87)

This invention relates, in general, to automatic synchronizers and more particularly to automatic synchronizers designed to control the paralleling of two sources of alternating current, under predetermined conditions.

In practice, the paralleling switch closing mechanism for paralleling the sources of alternating current should be energized at an advance angle proportional to the instantaneous frequency difference between the electromotive forces of the sources, to make allowance for the time required for relay operation and circuit breaker closing, in order that the two systems will be paralleled at substantially the exact instant of zero phase angle displacement between the electromotive forces of the two sources. Hereofore this was accomplished by deriving from the sources of alternating current a pulsating voltage which was dependent on the difference in the frequencies of the electromotive forces of the sources and then obtaining a control voltage which is dependent upon the magnitude of the pulsating voltage and on the rate of change of the pulsating voltage. Such a control voltage is suitable when it is controlling apparatus which has a relatively high input impedance. However, if it is to control a component which has a relatively low input impedance, such as a transistorized amplifier, then such a control voltage is unsuitable.

It is also desirable that the synchronizer should operate to energize the paralleling switch only if the instantaneous frequency difference between the two systems to be paralleled is less than a predetermined frequency difference, in order to prevent tying together generators which are operating at too great a difference in speed. In the prior art this function was accomplished by means of nonstatic components. Such prior art non-static components are not very reliable and maintenance costs are increased.

An object of this invention is to provide a new and improved control means for automatically paralleling a plurality of sources of alternating current.

Another object of this invention is to provide for so automatically paralleling two sources of alternating current having a given slip frequency therebetween that the two sources are paralleled at substantially the in-phase condition.

A further object of this invention is to provide in a paralleling system a circuit which senses a pulsating voltage which is dependent on the difference in the frequencies of the electromotive forces of the sources being paralleled and which has a current type output which is dependent upon both the magnitude of the pulsating voltage and the rate of change of the pulsating voltage, to thus permit the sensing circuit to control an amplifier having a low input impedance, such as a transistorized amplifier.

An additional object of this invention is to provide static control means which only effects a paralleling of two sources of alternating current provided the slip frequency between the two sources is below a predetermined value.

Still another object of this invention is to provide for preventing the energization of relaying means, which effects a paralleling of two sources of alternating current, until a pulsating voltage, which is dependent upon the frequency difference between the electromotive forces of the sources, reaches a predetermined magnitude at a proper interval preceding the in-phase condition of the electromotive forces by so interconnecting a zener diode that it is responsive to the pulsating voltage and is interconnected to effect an energization of the relay means when the pulsating voltage reaches the predetermined magnitude.

Still another object of this invention is to provide for energizing the operating coil of a circuit breaker, which effects a paralleling of the two sources of alternating current, even though the control signal derived from the pulsating voltage which is dependent upon the frequency difference between the electromotive forces of the two sources has a shorter time duration than that required to effect an energization of the operating coil, by so interconnecting a timing circuit in the paralleling system that a power source is connected to supplement the control signal and thus effect an energization of the operating coil.

Other objects of this invention will become apparent from the following description when taken in conjunction with the accompanying drawings in which.

Figure 1:
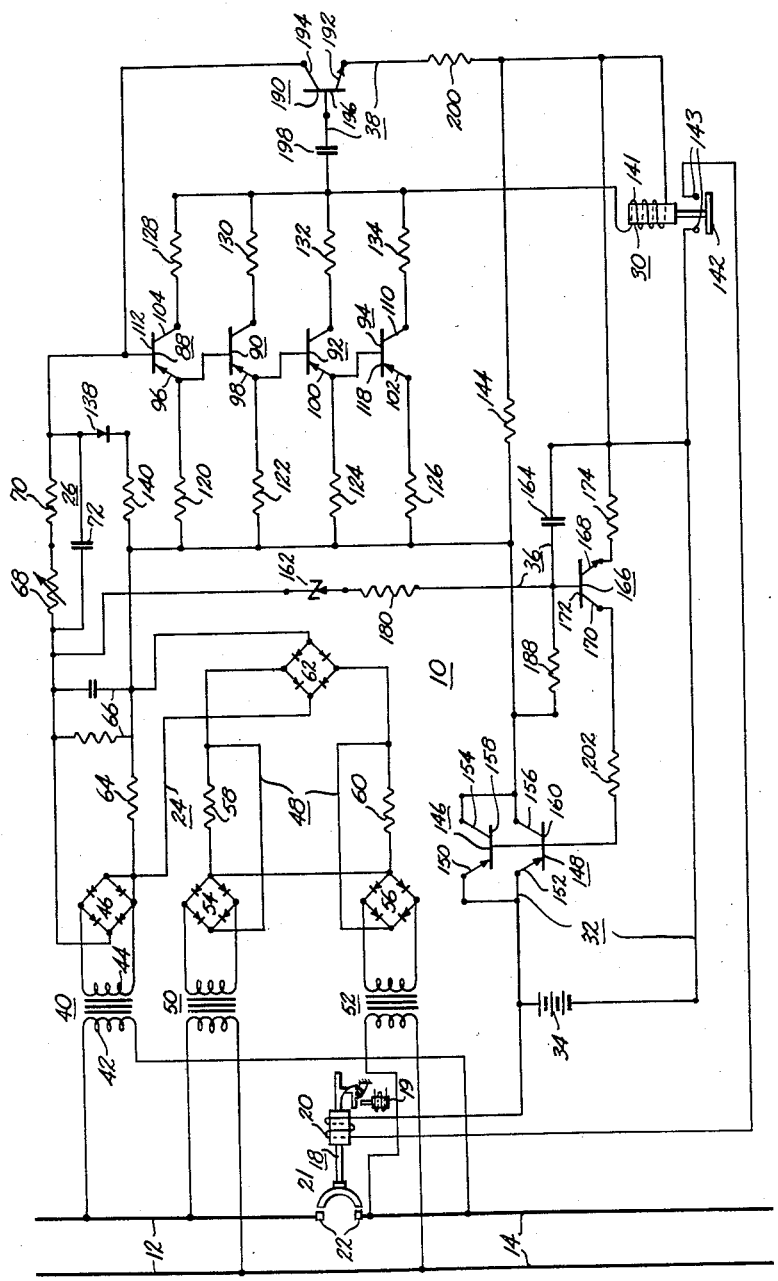
Fig. 1 is a schematic diagram of circuits and apparatus embodying teachings of this invention.
Figure 4:
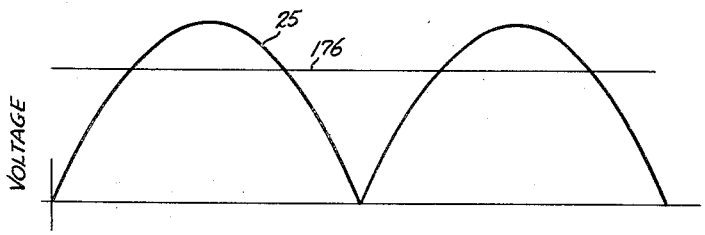
Fig. 4 is a graph illustrating the pulsating voltage appearing at the output of the sensing circuit illustrated in Fig. 1 for a given frequency difference between the electromotive forces of the sources to be paralleled.
Figure 6:
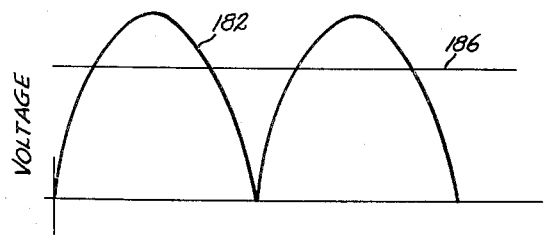
Figure 7:
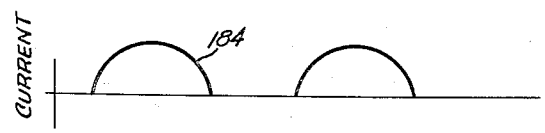

Fig. 6 is a graph illustrating the pulsating voltage appearing at the output of the sensing circuit shown in Fig. 1 when the frequency difference between the electromotive forces of the sources to be paralleled is larger than that illustrated in Fig. 4, and Fig. 7 is a graph illustrating the current flow through a capacitor illustrated in Fig. 1 when the pulsating voltage appearing at the output of the sensing circuit shown in Fig. 1 is as represented in Fig. 6 and the zener diode shown in Fig. 1 conducts current in the reverse direction at a magnitude as represented in Fig. 6.

Referring to Fig. 1 there is illustrated a synchronizer 10 embodying the teachings of this invention and which is connected to effect a paralleling of two sources of alternating current 12 and 14. In operation, the synchronizer 10 controls a circuit breaker 18, having, a trip coil 19, an operating or closing coil 20 and a movable contact 21 disposed to be actuated into engagement with stationary contacts 22. When actuated to the circuit closed position the circuit breaker 18 parallels the two sources of alternating current 12 and 14.

In general, the synchronizer 10 includes a sensing circuit 24 for deriving from the two sources of alternating current 12 and 14 a pulsating voltage, as represented at 25 in Fig. 4, which is dependent on the difference in the frequencies of the electromotive forces of the two sources of alternating current 12 and 14; an anticipatory circuit 26 for producing a current output which is dependent on the magnitude of the pulsating voltage 25 and the rate of change of the pulsating voltage 25; a transistorized amplifier 28 which is controlled by the current output from the anticipatory circuit 26; a relay 30 responsive to the output of the amplifier 28 for effecting the energization of the operating coil 20 of the circuit breaker 18; circuit means 32 for connecting a source 34 of power or direct-current voltage to the amplifier 28; circuit means 36 for preventing the application of the direct-current voltage of the source 34 to the amplifier 28 when either the magnitude of the pulsating voltage 25 has not reached a predetermined value or the frequency of the pulsating voltage 25 is above a predetermined value; and circuit means 38 for maintaining another control input to the amplifier 28 from the source 34 of direct-current voltage for a predetermined time interval after the initial output from the amplifier 28.

Referring more particularly to the sensing circuit 24, the sensing circuit 24 comprises a transformer 40 having a primary winding 42 and a secondary winding 44, the primary winding 42 being electrically connected to the sources 12 and 14 in order to produce across the secondary winding 44 an alternating voltage that is dependent on the vector difference between the electromotive forces of the sources of alternating current 12 and 14. Rectification of the alternating voltage appearing across the secondary winding 44 is obtained by means of a full-wave dry-type rectifier 46. However, at times there is a difference in the magnitudes of the electromotive forces of the sources 12 and 14. Therefore, in order to compensate for such a difference in the magnitudes of the electromotive forces of the sources 12 and 14 and thus effect the pulsating voltage 25 which is dependent only on the difference in the frequencies of the electromotive forces of the sources 12 and 14, a compensating circuit 48 is provided.

The compensating circuit 48 includes an isolation transformer 50 which produces at its output a measure of the electromotive force of the source 12 and an isolation transformer 52 which produces at its output a measure of the electromotive force of the source 14. Rectification of the output of the transformers 50 and 52 is obtained by means of the full-wave dry-type rectifier 54 and 56, respectively. A measure of the difference in the direct-current outputs of the rectifiers 54 and 56 is produced across resistors 58 and 60 and this difference voltage is applied to a full-wave dry-type rectifier 62 so as to produce a compensating voltage of one given polarity irrespective of which of the electromotive forces of the sources 12 and 14 has the greater value. The compensating voltage is applied to a resistor 64 in such a manner that the voltage across the resistor 64 opposes the output voltage of the rectifier 46. Thus, after filtering out the alternating components of the combined voltage appearing across the output of the rectifier 46 and across the resistor 64 by means of a filter 66 the pulsating voltage 25 is obtained which is dependent only on the frequency difference between the electromotive forces of the sources 12 and 14. In operation, the pulsating voltage 25 occurs once per second for each cycle of difference in the frequencies of the electromotive forces of the sources 12 and 14. For example, if the frequency difference is five cycles the pulsating voltage 25 will be 0.2 second in duration.

When the pulsating voltage 25 reaches zero magnitude, as illustrated in Fig. 4, coincidence between the electromotive forces of the sources 12 and 14 occurs. In order to predict at some time prior to the phase coincidence when the pulsating voltage 25 will reach zero the anticipatory circuit 26 is provided. As illustrated in Fig. 1, the anticipatory circuit 26 includes a series circuit comprising a variable resistor 68 and a fixed resistor 70, and a capacitor 72 connected in parallel circuit relationship with the series circuit. In practice, the RC time constant of the anticipatory circuit 26 can be changed by adjusting the variable resistor 68.

Specifically, the anticipatory circuit 26 produces a current output which changes polarity at a predetermined time interval before phase coincidence, said time interval being proportional to the product of the parallel capacitance and the parallel resistance provided the rate of change of the pulsating voltage 25 is subtsantially constant and the input impedance of the transistorized amplifier 28 is relatively low. Thus, the time interval as represented at 74 in Fig. 2 remains substantially constant over the desired operating range.

A current output which changes polarity at a predetermined time interval before phase coincidence between the electromotive forces of the sources 12 and 14 may be obtained by combining a current which is proportional to the instantaneous magnitude of the pulsating voltage 25 with a current which is proportional to the instantaneous magnitude of the rate of change of the pulsating voltage 25. The above may be stated algebraically as follows:

$$i = \frac{1}{R}e + C\frac{de}{dt} = 0$$

where $i$ is the current output from the anticipatory circuit 26, $e$ the instantaneous magnitude of the pulsating voltage 25, R the total resistance of the resistors 68 and 70, C the capacitance of the capacitor 72, and $$\frac{de}{dt}$$

the instantaneous magnitude of the rate of change of the pulsating voltage 25.

In the above equation $$\frac{1}{R}e$$

$e$ represents the current flow through the resistors 68 and 70 of the anticipatory circuit 26. This current flow through resistors 68 and 70 for a given frequency difference between the electromotive forces of the sources 12 and 14 is represented at 75 in Fig. 2. On the other hand, the current flow through the capacitor 72 is represented in the above equation by $$C\frac{de}{dt}$$

Figure 2:
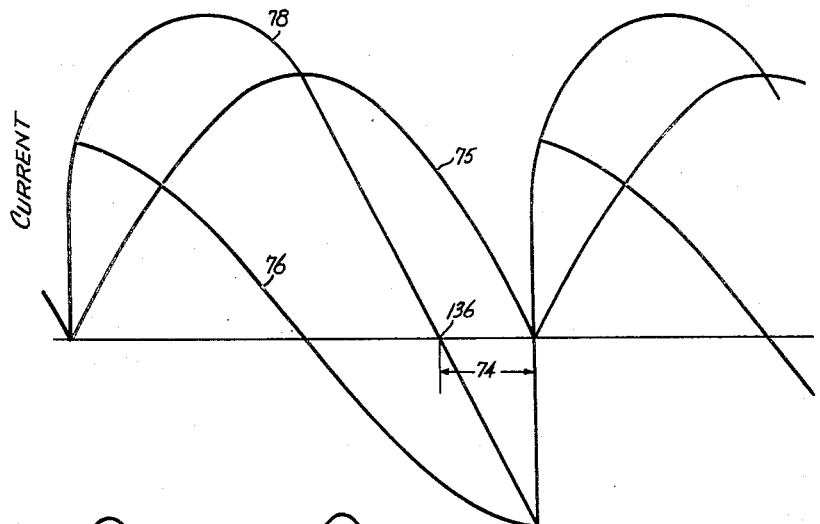
Fig. 2 is a graph illustrating the total current output from the anticipatory circuit shown in Fig. 1 and the current flow through each branch of the anticipatory circuit for a given frequency difference between the electromotive forces of the sources to be paralleled.

This latter current flow through the capacitor 72 is represented in Fig. 2 at 76. The total current output from the anticipatory circuit 26, that is $i$, is represented in Fig. 2 at 78.

Figure 3:
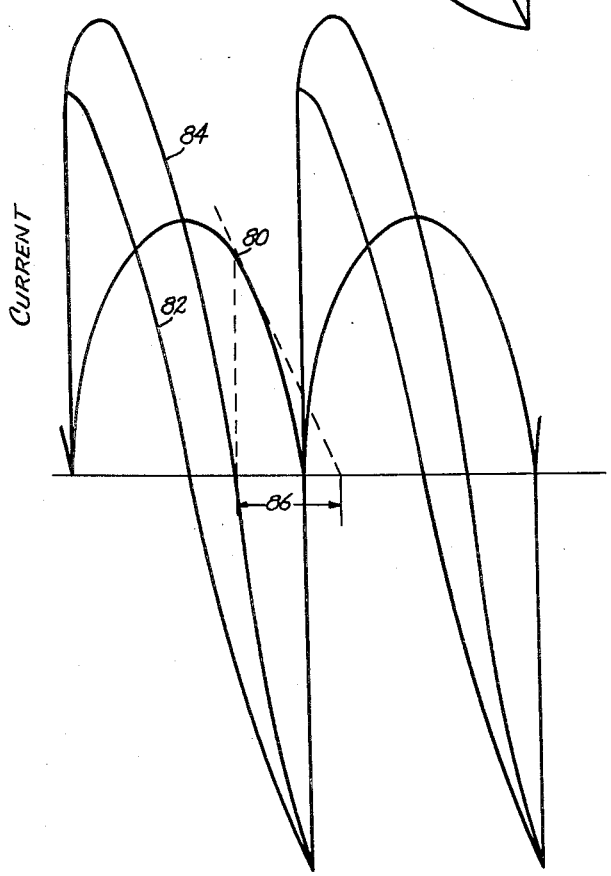
Fig. 3 is a graph illustrating the total current output from the anticipatory circuit shown in Fig. 1 and the current flow through each branch of the anticipatory circuit for a larger frequency difference between the electromotive forces of the sources to be paralleled.

Referring to Fig. 3 there is illustrated curves 80, 82 and 84 which correspond to the curves 75, 76 and 78, respectively, of Fig. 2 except that in the case shown in Fig. 3 the frequency difference between the electromotive forces of the sources 12 and 14 is larger than is the case represented in Fig. 2. It is to be noted that the time interval 86 which begins at the time the current output from the anticipatory circuit 26 reaches zero is of the same duration as the time interval 74 illustrated in Fig. 2. The reason for this will be explained more fully hereinafter.

Other of the above statements may be stated algebraically as follows:

$$\frac{de}{dt} = \frac{de}{dt}$$

$$de = \frac{de}{dt}dt$$

If $\frac{de}{dt}$ is constant, then $\Delta e = \frac{de}{dt}\Delta t$ $$\therefore \Delta t = \frac{\Delta e}{\frac{de}{dt}}$$

$$-e = \Delta e = \frac{C\frac{de}{dt}}{\frac{1}{R}} = RC\frac{de}{dt}$$

$$\Delta t = \frac{RC\frac{de}{dt}}{\frac{de}{dt}} = RC$$

Therefore as can be seen from the above equations if $$\frac{de}{dt}$$

is constant then $\Delta t$ is likewise a constant which is proportional to RC.

Referring more particularly to the transistorized amplifier 28, the amplifier 28 includes a plurality of p-n-p junction type transistors 88, 90, 92 and 94 which have emitter electrodes 96, 98, 100 and 102, respectively, collector electrodes 104, 106, 108 and 110, respectively, and base electrodes 112, 114, 116 and 118, respectively. In order to minimize the effect of leakage currents in the amplifier 28 when no control signal is applied so as to render the emitter electrode 96 positive with respect to the base electrode 112, of the transistor 88, resistors 120, 122, 124 and 126 are interconnected with the emitter electrodes 96, 98, 100 and 102, respectively. In operation, when no control signal is applied so as to render the emitter electrode 96 positive with respect to the base electrode 112, of the transistor 88, the resistors 120, 122, 124, 126 render their respective associated base electrodes 112, 114, 116, 118 positive with respect to the associated emitter electrodes 96, 98, 100 and 102, respectively. Resistors 128, 130, 132 and 134 are connected in circuit relationship with the collector electrodes 104, 106, 108 and 110, respectively, to provide a degree of isolation for each of the collector electrodes.

As can be seen from Fig. 2 the control current output from the anticipatory circuit 26 reverses polarity at a point 136. In order to provide a low impedance path for the flow of current from the anticipatory circuit 26 when this control current is positive as represented by the curve 78 in Fig. 2 and in order to provide a high impedance path to the flow of the output current from the anticipatory circuit 26 when this control current is negative as represented in Fig. 2, to thus force the control current from the output of the anticipatory circuit 26 through the emitter 96 and the base electrode 112, of the transistor 88, a diode 138 is connected in series circuit relationship with the anticipatory circuit 26. At extremely low magnitudes of control current output from the anticipatory circuit 26 the diode 138 is not effective in blocking the control current. Therefore, a resistor 140 is connected in series circuit relationship with the diode 138 to effectively block this low magnitude control current from the output of the anticipatory circuit 26.

For the purpose of selectively energizing the operation coil 20, of the circuit breaker 18, to thus parallel the sources 12 and 14, the relay 30 is connected to be responsive to the output of the amplifier 28. As illustrated, the relay 30 includes an operating coil 141, and a movable contact 142 which is disposed to be actuated into engagement with stationary contacts 143. In particular, the operating coil 141 of the relay 30 is connected in parallel circuit relationship with a resistor 144. The function of the resistor 144 will be described hereinafter.

The circuit means 32 for connecting the source 34 of direct-current voltage to the transistorized amplifier 28 includes the operating coil 141, of the relay 30 and two p-n-p junction type transistors 146 and 148 which are connected in parallel circuit relationship with one another to increase the current carrying capacity of the circuit means 32. As will be explained more fully hereinafter, the transistors 146 and 148 are operated in a switching mode to selectively connect the source 34 of direct-current voltage to the amplifier 28 depending upon various existing conditions. In this instance, the transistors 146 and 148 comprise emitter electrodes 150 and 152, respectively, collector electrodes 154 and 156, respectively, and base electrodes 158 and 160, respectively.

As hereinbefore mentioned, the circuit means 36 is provided for preventing the application of the direct-current voltage of the source 34 to the amplifier 28 when either the magnitude of the pulsating voltage 25 has not reached a predetermined value or the frequency of the pulsating voltage 25 is above a predetermined value where it would be undesirable to parallel the sources 12 and 14. As illustrated, the circuit means 36 includes a zener diode 162 and a capacitor 164 which are connected to be responsive to the pulsating voltage 25 appearing at the output of the sensing circuit 24. Specifically, the zener diode 162 is connected in circuit relationship with the capacitor 164 and with the resistor 144, one end of the circuit being connected to the junction point of the resistor 140 and the filter 66 and the other end of the circuit being connected to the junction point of the filter 66 and the anticipatory circuit 26.

An n-p-n junction type transistor 166 having an emitter electrode 168, a collector electrode 170, and a base electrode 172 is connected to be controlled in accordance with the action of the zener diode 162 and in accordance with the voltage developed across the capacitor 164. The transistor 166 is also connected to control the switching action of the transistors 146 and 148. In particular, the capacitor 164 is connected between the base electrode 172 and the emitter electrode 168 through a resistor 174. With the capacitor 164 so connected the transistor 166 is rendered conductive provided the voltage across the capacitor 164 reaches a predetermined magnitude. If the frequency of the pulsating voltage 25 is above a predetermined value, as determined by the frequency difference in the electromotive forces of the sources 12 and 14, then insufficient voltage will appear across the capacitor 164 to render the transistor 166 conductive. Since the transistor 166 controls the switching action of the transistors 146 and 148 the source 34 of direct-current voltage will not be connected to the amplifier 28 if the frequency of the pulsating voltage 25 is above the predetermined value. Thus, under such conditions the operating coil 141 of the relay 30 will not be energized and the circuit breaker 18 will not be actuated to the circuit closed position to thus parallel the sources 12 and 14.

Figure 5:
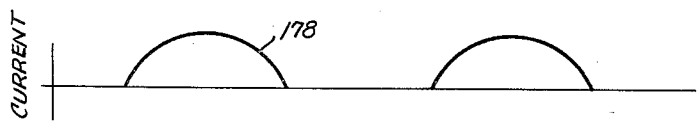
Fig. 5 is a graph illustrating the current flow through a capacitor shown in Fig. 1 when the pulsating voltage appearing at the output of the sensing circuit has a frequency as illustrated in Fig. 4 and the zener diode illustrated in Fig. 1 conducts in the reverse direction at a magnitude as represented in Fig. 4.

Before current is able to flow through the capacitor 164 the zener diode 162 must conduct current in the reverse direction. In practice, the zener diode 162 is such that it will not conduct current in the reverse direction until the pulsating voltage 25 reaches a predetermined magnitude such as represented at 176 in Fig. 4. When the predetermined value as represented at 176 is reached current flows through the capacitor 164 as represented at 178 in Fig. 5. In order to increase the time required to charge up the capacitor 164 a resistor 180 is connected in series circuit relationship with the capacitor 164. As can be seen from Figs. 6 and 7, if the frequency of the pulsating voltage appearing at the output of the sensing circuit 24 is increased so as to be represented by a curve 182 in Fig. 6 then the current flow through the capacitor 164 is as represented at 184 in Fig. 7. This is of course assuming that the zener diode 162 has broken down and conducts current in the reverse direction at substantially the same magnitude as represented at 186 in Fig. 6. Since the impedance of the amplifier 28 as seen from circuit 32 is relatively high the resistor 144, having a relatively low impedance, is connected across the output of circuit 32 so as to prevent a voltage across the output of circuit 32 as effected by the source 34 from charging up the capacitor 164 so as to render the transistor 166 conductive even though the frequency of the pulsating voltage 25 is above the predetermined value under which conditions the transistor 166 would not be rendered conductive by the current flow through the capacitor 164 as effected by the pulsating voltage 25.

Since the zener diode 162 prevents the source 34 of direct-current voltage from being connected to the amplifier 28 until the magnitude of the pulsating voltage 25 reaches a magnitude such as represented at 176 or 186 it prevents the possibility of initiating a paralleling action at a time where there is substantially phase coincidence between the electromotive forces of the sources 12 and 14. In other words, if power was applied to the amplifier 28 at such a time the closing of the circuit breaker 18 would take place not at phase coincidence of the electromotive forces of the sources 12 and 14 but rather at some time after phase coincidence has occurred.

In order to maintain the transistor 166 conductive, and thus the transistors 146 and 148 conductive, irrespective of the continuation of the voltage across the capacitor 164, a resistor 188 is connected between the collector electrode 156 of the transistor 148, and the base electrode 172, of the transistor 166. As can be seen from Fig. 1, a control current for the transistor 166 can flow from the positive side of the source 34, of direct-current voltage, when the transistors 146 and 148 are conductive, through the emitter electrode 152 and the collector electrode 156, of the transistor 148, the resistor 188, the base electrode 172 and the emitter electrode 168, of the transistor 166, and the resistor 174, to the negative side of the source 34 of direct-current voltage.

Referring to Fig. 3 if the frequency of the pulsating voltage appearing at the output of the sensing circuit 24 is relatively high the time interval 86 ends at a time after phase coincidence of the electromotive forces of the sources 12 and 14 occurs. Therefore, unless provided for it is possible for the control output, from the anticipatory circuit 26 to the amplifier 28 to terminate before the circuit breaker 18 is actuated to the circuit close position. Therefore, in order to eliminate this difficulty the circuit means 38 is provided so as to provide an additional control input to the amplifier 28 for a predetermined time after an initial output from the amplifier 28. This time interval provided by the circuit means 38 is of such duration that it insures a closing operation of the breaker 18 irrespective of the time duration of the input control signal to the amplifier 28 as received from the anticipatory circuit 26. Specifically, an n-p-n junction type transistor 190, having an emitter electrode 192, a collector electrode 194, and a base electrode 196, is so interconnected with the source 34 of direct-current voltage that an additional control current flows through the input of the amplifier 28 for a predetermined time as determined by a capacitor 198 which is connected to be responsive to the output of the amplifier 28. For the purpose of rendering the transistor 190 conductive when an output current from the amplifier 28 flows through the operating coil 141, of the relay 30, the emitter electrode 192, of the transistor 190, is connected to one end of the operating coil 141 through a resistor 200, which functions to limit the magnitude of the load current flowing through the transistor 190, and the base electrode 196 is connected to the other end of the operating coil 141 through the capacitor 198.

The operation of the synchronizer 10 shown in Fig. 1 will now be described. Assuming the pulsating voltage 25 appearing at the output of the sensing circuit 24 has reached a magnitude greater than that represented at 176 in Fig. 4 then current will flow from the junction point of the filter 66 and the anticipatory circuit 26 through the zener diode 162, the resistor 180, the capacitor 164, and the resistor 144, to the junction point of the resistor 140 and the filter 66. Assuming further that the frequency of the pulsating voltage 25 is below the predetermined value so that sufficient voltage is developed across the capacitor 164 to render the transistor 166 conductive then control current will flow from the positive side of the source of direct-current voltage 34 through the emitter electrodes 150 and 152, and the base electrodes 158 and 160, of the transistor 146 and 148, respectively, a resistor 202, the collector and emitter electrodes 170 and 168, of the transistor 166, and the resistor 174, to the negative side of the source 34 of direct-current voltage. Such an action renders the transistors 146 and 148 conductive to thereby connect the source 34 to the amplifier 28. In particular, an energizing circuit extends from the positive side of the source 34 of direct-current voltage through the emitter electrode 152 and the collector electrode 156, of the transistor 148, the parallel connected transistors 88, 90, 92 and 94 of the amplifier 28, and the operating coil 141, of the relay 30, to the negative side of the source 34 of direct-current voltage.

Simultaneously control current flows from the output of the anticipatory circuit 26 through the resistor 120 and the emiter electrode 96 and the base electrode 112 of the transistor 88 once the point 136, as shown in Fig. 2, is reached. The latter action effects a current flow through the operating coil 141, of the relay 30, to thus effect an actuation of the movable contact 142 into engagement with the stationary contacts 143. As soon as the operating coil 141, of the relay 30, is energized a voltage appears there across of such a polarity as to render the transistor 190 conductive. When the transistor 190 is rendered conductive an additional control current flows through the input of the amplifier 28. Specifically, current flows from the positive side of the source 34 of direct-current voltage through the emitter electrode 152 and the collector electrode 156, of the transistor 148, the resistor 120, the emitter electrode 96 and the base electrode 112, of the transistor 88, the collector electrode 194, and the emitter electrode 192, of the transistor 190, and the resistor 200, to the negative side of the source 34 of direct-current voltage. However, as soon as the operating coil 141, of the relay 30, is energized output current from the amplifier 28 flows through the capacitor 198. In particular, current flows from the junction point of the resistors 128, 130, 132 and 134 through the capacitor 198, the base electrode 196 and the emitter electrode 192, of the transistor 190, the resistor 200, and the resistor 144, to the junction point of the resistors 120, 122, 124 and 126. The latter current flow effects a charging up of the capacitor 198 until the voltage across the capacitor 198 is of sufficient magnitude to render the transistor 190 non-conductive. However, as hereinbefore mentioned the transistor 190 remains conductive for a sufficient time to insure that the circuit breaker 18 is actuated to the circuit closed position, to thus effect the paralleling of the sources 12 and 14.

When the movable contact 142 has been actuated into engagement with the stationary contacts 143 an energizing circuit is completed to the operating coil 20 of the circuit breaker 18 which extends from the positive side of the source 34 of direct-current voltage through the operating coil 20, of the circuit breaker 18, and the stationary contacts 143 and the movable contact 142, of the relay 30, to the negative side of the source 34 of direct-current voltage. The energization of the operating coil 20 effects an actuation of the movable contact 21 into engagement with the stationary contacts 22, of the circuit breaker 18, to thus effect a paralleling of the sources 12 and 14.

The apparatus embodying the teachings of this invention has several advantages. For instance, with the exception of the relay 30 and the circuit breaker 18 the apparatus comprises entirely static components. This renders the synchronizer 10 reliable and minimizes maintenance costs. In addition, means is provided for preventing a faulty operation of the synchronizer 10 on first energizing it. Further, means is provided for insuring a paralleling of the sources 12 and 14 irrespective of the time duration of the control signal derived from the sources 12 and 14.

Since certain changes may be made in the above described apparatus and circuits and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a system for paralleling sources of alternating current at the instant of phase coincidence, the combination comprising, means for deriving from said sources a pulsating voltage which is dependent on the difference in the frequencies of the electromotive forces of said sources, a capacitor, resistor means connected in parallel circuit relationship with the capacitor, circuit means for impressing said pulsating voltage on the parallel circuit so that the current output from the parallel circuit is dependent on both the magnitude of the pulsating voltage and the rate of change of the pulsating slip voltage, and relaying means connected to be controlled by said current output to effect a paralleling of said sources.

2. In a system for paralleling sources of alternating current at the instant of phase coincidence, the combination comprising, means for deriving from said sources a pulsating voltage which is dependent on the difference in the frequencies of the electromotive forces of said sources, a capacitor, resistor means connected in parallel circuit relationship with the capacitor, circuit means for impressing said pulsating voltage on the parallel circuit so that the current output from the parallel circuit is dependent on both the magnitude of the pulsating voltage and the rate of change of the pulsating voltage, a transistorized amplifier having an input and an output, the input of the transistorized amplifier being connected to be controlled by said current output, and relaying means connected to the output of the transistorized amplifier to effect a paralleling of said source.

3. In a system for paralleling sources of alternating current at the instant of phase coincidence, the combination comprising, means for deriving from said sources a pulsating voltage which is dependent on the difference in the frequencies of the electromotive forces of said sources, circuit means connected to be responsive to said pulsating voltage for effecting a paralleling of said sources, means for applying power to said circuit means to thus permit the paralleling of said sources, and a zener diode responsive to said pulsating voltage and connected to prevent the application of said power to said circuit means as long as said pulsating voltage is below a predetermined magnitude.

4. In a system, adapted to be connected to a source of voltage, for paralleling sources of alternating current at the instant of phase coincidence, the combination comprising, means for deriving from said sources a pulsating voltage which is dependent on the difference in the frequencies of the electromotive forces of said sources, a capacitor, resistor means connected in parallel circuit relationship with the capacitor, circuit means for impressing said pulsating voltage on the parallel circuit so that the current output from the parallel circuit is dependent on both the magnitude of the pulsating voltage and the rate of change of the pulsating voltage, an amplifier having an input and an output, the input of the amplifier being connected to be controlled by said current output, relaying means interconnected with the output of the amplifier for effecting a paralleling of said sources, a transistor having three electrodes, two of the three electrodes being so interconnected in the paralleling system as to effect a connection of said source of voltage to the amplifier when the transistor is in the conductive state, and a zener diode interconnected between the third electrode of the transistor and the circuit means for impressing said pulsating voltage on the parallel circuit so as to render the transistor conductive only when said pulsating voltage reaches a predetermined magnitude, to thus prevent the paralleling of said sources if said pulsating voltage has not reached said predetermined magnitude.

5. In a system, adapted to be connected to a source of voltage, for paralleling sources of alternating current at the instant of phase coincidence, the combination comprising, means for deriving from said sources a pulsating voltage which is dependent on the difference in the frequencies of the electromotive forces of said sources, relaying means responsive to said pulsating voltage for effecting a paralleling of said sources, a transistor having three electrodes, two of the three electrodes being so interconnected in the paralleling system as to effect a connection of said source of voltage to said relaying means when the transistor is in the conductive state, a capacitor connected between the remaining electrode of the three electrodes and one of said two of the three electrodes, and circuit means for rendering the capacitor responsive to said pulsating voltage so that the transistor is rendered conductive only if the frequency of said pulsating voltage is below a predetermined value, to thus prevent a paralleling of said sources when the frequency of said pulsating voltage is above said predetermined value.

6. In a system, adapted to be connected to a source of voltage, for paralleling sources of alternating current at the instant of phase coincidence, the combination comprising, means for deriving from said sources a pulsating voltage which is dependent on the difference in the frequencies of the electromotive forces of said sources, a capacitor, resistor means connected in parallel circuit relationship with the capacitor, circuit means for impressing said pulsating voltage on the parallel circuit so that the current output from the parallel circuit is dependent on both the magnitude of the pulsating voltage and the rate of change of the pulsating voltage, an amplifier having an input and an output, the input of the amplifier being connected to be controlled by said current output, relaying means interconnected with the output of the amplifier for effecting a paralleling of said sources, a transistor having three electrodes, two of the three electrodes being so interconnected in the paralleling system as to effect a connection of said source of voltage to the amplifier when the transistor is in the conductive state, a capacitor connected between the remaining electrode of the three electrodes and one of said two of the three electrodes, and other circuit means for rendering the capacitor responsive to said pulsating voltage so that the transistor is rendered conductive only if the frequency of said pulsating voltage is below a predetermined value, to thus prevent a paralleling of said sources when the frequency of said pulsating voltage is above said predetermined value.

7. In a system, adapted to be connected to a source of voltage, for paralleling sources of alternating current at the instant of phase coincidence, the combination comprising, means for deriving from said sources a pulsating voltage which is dependent on the difference in the frequencies of the electromotive forces of said sources, a capacitor resistor means connected in parallel circuit relationship with the capacitor, circuit means for impressing said pulsating voltage on the parallel circuit so that the current output from the parallel circuit is dependent on both the magnitude of the pulsating voltage and the rate of change of the pulsating voltage, an amplifier having an input and an output, the input of the amplifier being connected to be controlled by said current output, relaying means interconnected with the output of the amplifier for effecting a paralleling of said sources, a transistor having three electrodes, two of the three electrodes being so interconnected in the paralleling system as to effect a connection of said source of voltage to the amplifier when the transistor is in the conductive state, a capacitor connected between the remaining electrode of the three electrodes and one of said two of the three electrodes, and other circuit means, including a zener diode and said capacitor, connected to be responsive to said pulsating voltage so that the transistor is rendered conductive provided the magnitude of said pulsating voltage reaches a predetermined value and provided the frequency of said pulsating voltage is below a predetermined magnitude.

8. In a system, adapted to be connected to a source of voltage, for paralleling sources of alternating current at the instant of phase coincidence, the combination comprising, means for deriving from said sources a pulsating voltage which is dependent on the difference in the frequencies of the electromotive forces of said sources, a capacitor, resistor means connected in parallel circuit relationship with the capacitor, circuit means for impressing said pulsating voltage on the parallel circuit so that the current output from the parallel circuit is dependent on both the magnitude of the pulsating voltage and the rate of change of the pulsating voltage, an amplifier having an input and an output, the input of the amplifier being connected to be controlled by said current output, relaying means interconnected with the output of the amplifier for effecting a paralleling of said sources, and other circuit means, including a timing device responsive to the output from the amplifier, for connecting said source of voltage to the input of the amplifier so as to provide another control input to the amplifier for a predetermined time after an initial output from the amplifier.

9. In a system, adapted to be connected to a source of voltage, for paralleling sources of alternating current at the instant of phase coincidence, the combination comprising, means for deriving from said sources a pulsating voltage which is dependent on the difference in the frequencies of the electromotive forces of said sources, a capacitor, resistor means connected in parallel circuit relationship with the capacitor, circuit means for impressing said pulsating voltage on the parallel circuit so that the current output from the parallel circuit is dependent on both the magnitude of the pulsating voltage and the rate of change of the pulsating voltage, an amplifier having an input and an output, the input of the amplifier being connected to be controlled by said current output, relaying means interconnected with the output of the amplifier for effecting a paralleling of said sources, a transistor having three electrodes, other circuit means including two of the three electrodes of the transistor for connecting said source of voltage to the input of the amplifier, so as to provide another control input to the amplifier when the transistor is in a conductive state, and another capacitor connected to the remaining electrode of the three electrodes and connected to be responsive to the output of the amplifier to thus maintain said another control input to the amplifier for a predetermined time after an initial output from the amplifier.

No references cited.